United States Patent
Matsubara et al.

(10) Patent No.: US 7,237,963 B2
(45) Date of Patent: Jul. 3, 2007

(54) ROLLING PART AND POWER TRANSMISSION PART

(75) Inventors: Yukio Matsubara, Kuwana (JP); Kikuo Maeda, Kuwana (JP)

(73) Assignee: NTN Corporation, Osaka (JP)

( * ) Notice: Subject to any disclaimer, the term of this patent is extended or adjusted under 35 U.S.C. 154(b) by 183 days.

(21) Appl. No.: 10/515,314

(22) PCT Filed: May 19, 2003

(86) PCT No.: PCT/JP03/06237

§ 371 (c)(1),
(2), (4) Date: Jul. 19, 2005

(87) PCT Pub. No.: WO03/100277

PCT Pub. Date: Dec. 4, 2003

(65) Prior Publication Data

US 2006/0008193 A1 Jan. 12, 2006

(30) Foreign Application Priority Data

May 23, 2002 (JP) .............................. 2002-149428

(51) Int. Cl.
*F16C 19/08* (2006.01)

(52) U.S. Cl. ...................................... 384/544; 384/492
(58) Field of Classification Search ................ 384/569, 384/565, 544, 491, 492
See application file for complete search history.

(56) References Cited

FOREIGN PATENT DOCUMENTS

| DE | 199 28 775 A1 | 1/2000 |
|----|---------------|--------|
| JP | 02-153044 | 6/1990 |
| JP | 2002-363700 | 12/2002 |
| JP | 2003-048404 | 2/2003 |
| WO | WO 03/100277 A1 | 12/2003 |

*Primary Examiner*—Lenard A. Footland
(74) *Attorney, Agent, or Firm*—McDermott Will & Emery LLP

(57) ABSTRACT

There is provided a rolling component formed of a steel material of the medium carbon steel level that provides a rolling life improved to be comparable to that of bearing steel and also provides improved characteristic against surface-cracking, and a power transmission component including the rolling component. To achieve this, the rolling component is formed of steel having an induction hardened portion having a stress intensity factor range associated with tension associated-fatigue crack extension that has a lower limit $\Delta K_{th}$ of 6.2 Mpa$\sqrt{m}$.

6 Claims, 5 Drawing Sheets

ROLLING PART AND POWER TRANSMISSION PART

RELATED APPLICATION

This application is the U.S. National Phase under 35 U.S.C. Â 371 of International Application No. PCT/JP03106237, filed May 19, 2003, which in turn claims the benefit of Japanese Application No. 2002-149428, filed May 23, 2002, the disclosures of which Applications are incorporated by reference herein in their entirety.

TECHNICAL FIELD

The present invention relates to rolling components formed of induction hardened steel material, and experiencing repeated tensile stress and used for example under a severe condition for lubrication and/or a condition accompanied by slippery, and power transmission components including the rolling components.

BACKGROUND ART

Rolling bearings and other geometrically simple rolling components are formed of SUJ2 or similar bearing steels providing long rolling contact fatigue life. Bearing steel, however, is poor in workability and unsuitable for rolling components having complicated geometries. In contrast, S53C and similar medium carbon steels have satisfactory workability and are suitable for rolling components having complicated geometries. Typically, medium carbon steel is worked into a complicated geometry and then has a rolling portion induction hardened for use. Furthermore, medium carbon steel contains an expensive alloy element in a small amount. It is thus inexpensive and also contributes to saved rare resources.

Rolling components having complicated geometries, however, often receive not only a simple rolling load at the rolling portion. In addition to rolling, there are also slippery and repeated tensile stress other than rolling superimposed. As such, the rolling portion is prone to cracking. This invites early propagation of cracking and can result in fatal damage. This is considered to be attributed to that medium carbon steel has a shorter rolling contact fatigue life than bearing steel.

Recently, as energy conservation and miniaturization are pursued, rolling components increasingly tend to be used under severer conditions than before. Bearing steel, poor in workability, has its limitation in providing long life with productivity and cost considered, and there exists an increasing demand for a rolling component produced from a source material provided by a steel material corresponding to conventional medium carbon steel with its inexpensive alloy components C, Si and Mn modified in content. More specifically, there exists a demand for the following items (1) and (2):

(1) As seen at the medium carbon steel level, the induction hardened portion has a rolling contact fatigue life improved to be comparable to that of bearing steel; and (2) As seen at the medium carbon steel level, the induction hardened portion has increased surface cracking resistance.

Item (1) is effective in improving reliability against rolling fatigue and item (2) is effective in reducing surface cracking attributed to slippery.

DISCLOSURE OF THE INVENTION

The present invention contemplates a rolling component formed of steel material of the medium carbon steel level that provides a rolling life improved to be comparable to that of bearing steel and has an improved surface cracking resistance characteristic, and a power transmission component including the rolling component.

The present rolling component is formed of steel having an induction hardened portion allowing a stress intensity factor range associated with tension associated-fatigue crack extension that has a range with a lower limit ΔKth of at least 6.2 MPa$\sqrt{}$m. The stress intensity factor range with the lower limit of at least 6.2 MPa$\sqrt{}$m allows lager resistance against fatigue cracking caused and progressing as tensile stress is repeatedly exerted than conventional material (or S53C). Conventionally, there has not been a case noting that a rolling component is formed of steel material having an induction hardened portion required to have lower limit ΔKth of at least a prescribed value. Furthermore there is no disclosure of medium carbon steel S53C for a rolling component as conventional that has an induction hardened portion with the lower limit ΔKth as above.

Ensuring the above lower limit ΔKth allows a rolling portion to have a surface more resistant to cracking and propagation thereof when it rolls as well as it slides and repeated tensile stress is superimposed.

BEST MODES FOR CARRYING OUT THE INVENTION

Figure 1:
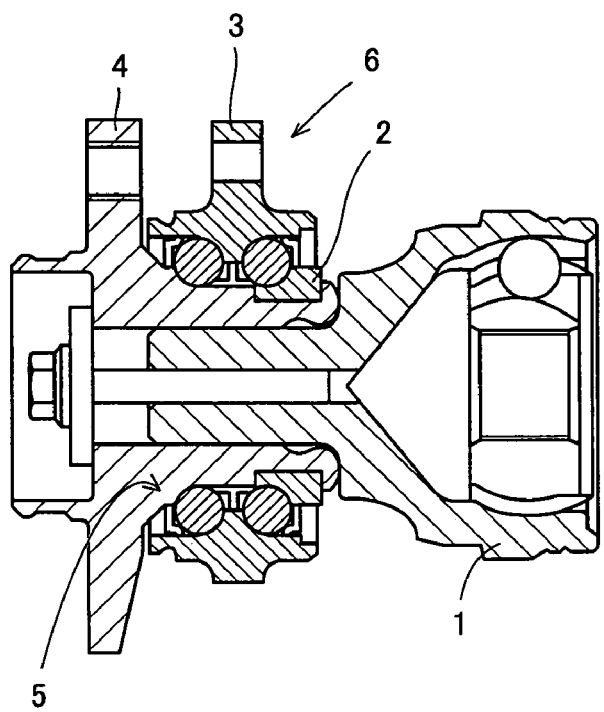
FIG. 1 is a schematic view of a third generation hub unit including a wheel bearing and a constant velocity joint united together that employs the present rolling component.
Figure 2:
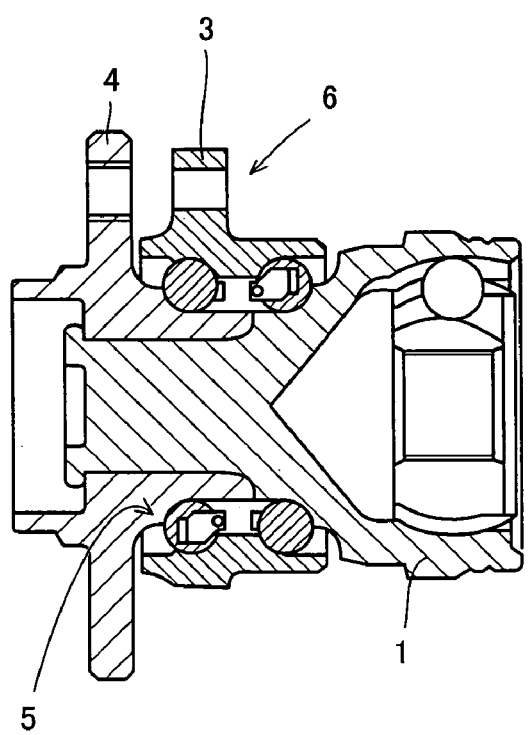
FIG. 2 is a schematic view of a fourth generation hub unit including a wheel bearing and a constant velocity joint united together that employs the present rolling component.

Hereinafter with reference to examples the present invention will more specifically be described. FIGS. 1 and 2 show hub units employing the present rolling component. FIG. 1 schematically shows a third generation hub unit (H/U) corresponding to a hub joint including a wheel bearing 6 and a constant velocity joint united together. FIG. 2 schematically shows wheel bearing 6 including a forth generation H/U further evolved from the third generation H/U. In the FIG. 1 H/U one inner ring race 2 is integral with a hub wheel 4 and the other inner ring race 5 is crimped to hub wheel 4. An outer ring 3 is fixed directly to a knuckle. In the third generation H/U constant velocity joint 1 is an independent component.

By contrast the FIG. 2 forth generation H/U has a more compact structure. While one inner ring race 5 is integral with hub wheel 4, which feature is the same as the third generation, the other inner ring race is integral with a joint outer ring 3. Accordingly that portion is required to have (I) a rolling contact fatigue life as the portion acts as a bearing race portion and (II) a slippery accompanied-rolling, swinging life as the portion acts as a joint portion.

EXAMPLE 1

As shown in Table 1, steels A1-A9 falling within the present invention's composition range are used as examples of the present invention, and steels B1-B10 departing from the present invention's composition range are used as comparative examples. As indicated under the table as a note, comparative example B1 is a conventional material S53C and B10 is bearing steel SUJ2.

TABLE 1

| Type | No. | Alloy Composition (wt %) | | | | Note |
| --- | --- | --- | --- | --- | --- | --- |
| | | C | Si | Mn | Cr | |
| Present Invention's Examples | A1 | 0.56 | 0.82 | 0.83 | * | |
| | A2 | 0.60 | 0.80 | 0.60 | * | |
| | A3 | 0.53 | 0.62 | 0.98 | * | |
| | A4 | 0.63 | 0.62 | 0.60 | * | |
| | A5 | 0.52 | 1.16 | 0.74 | * | |
| | A6 | 0.64 | 0.83 | 0.60 | * | |
| | A7 | 0.55 | 0.81 | 0.60 | * | |
| | A8 | 0.58 | 1.00 | 0.80 | * | |
| | A9 | 0.61 | 0.88 | 0.72 | * | |
| Comparative Examples | B1 | 0.53 | 0.20 | 0.85 | * | S53C |
| | B2 | 0.53 | 1.00 | 0.31 | * | |
| | B3 | 0.55 | 1.00 | 0.30 | * | |
| | B4 | 0.63 | 0.10 | 0.58 | * | |
| | B5 | 0.55 | 0.11 | 0.60 | * | |
| | B6 | 0.53 | 0.38 | 0.25 | * | |
| | B7 | 0.53 | 0.20 | 0.25 | * | |
| | B8 | 0.55 | 0.20 | 0.75 | * | |
| | B9 | 0.45 | 0.80 | 0.80 | * | |
| | B10 | 1.00 | 0.25 | 0.35 | 1.5 | SUJ2 |

* 0.2 to 0.3 wt % thereof contained (1) Rolling Contact Fatigue Test

As has been described previously, medium carbon steel has a shorter rolling contact fatigue life than bearing steel. When use under severe conditions expected in future is considered, it is desirable that medium carbon steel have a rolling contact fatigue life comparable to that of bearing steel. The specimens are induction hardened to allow a hardened layer to have a depth of approximately 2 mm. In this test, the number of tests N is 15, and rolling contact fatigue life is estimated by $L_{10}$ (10% life). The rolling contact fatigue test is conducted with the following conditions:

dimension of specimen: 12 mm in outer diameter and 22 mm in length dimension of counterpart steel ball: 19.05 mm in diameter maximum contact stress Pmax: 5.88 GPa load rate: 46,240 cycles/min.

lubricant: turbine oil VG68

(2) Rolling and Sliding Fatigue Test

Needle bearings' counter bearings, constant velocity joints, ball screws and other similar parts in rolling portions roll and in addition slide. Accordingly they are required not only to have long life as they simply roll but also as they slide. A rolling and sliding fatigue test is a 2-cylinder test conducted to estimate a life of a material as it rolls as well as slides. The specimens are induction hardened to allow a hardened layer to have a depth of approximately 2 mm. The test is conducted with the following conditions:

piece to be tested: 40 mm in outer diameter by 12 mm in width, without an outer diameter having the other principal curvature (straight)

counterpart test piece: formed of bearing steel SUJ2 and having 40 mm in outer diameter by 12 mm in width, with an outer diameter having the other principal curvature of 60 mm, maximum contact stress Pmax: 3.5 GPa rotation rate: 1,800 rpm for piece to be tested and 2,000 rpm for counterpart test piece lubricant: turbine oil VG46

(3) Test Result

Table 2 shows a result of the rolling contact fatigue test and that of the rolling and sliding fatigue test. As measured, conventional medium carbon steel S53C (comparative example B1) has a rolling contact fatigue life $L_{10}$ of 2,630×$10^4$ and bearing steel SUJ2 (comparative example B10) has a rolling contact fatigue life $L_{10}$ of 7,300×$10^4$, and S53C is less than half the bearing steel. Although the present invention's examples, formed only of inexpensive alloy component, could not be comparable to bearing steel SUJ2, it is desirable that they have an $L_{10}$ at least approximately twice S53C, i.e., at least 5,000×$10^4$. In this regard, the present invention's examples A1-A9 all provide at least 5,000×$10^4$ and in particular, A5, A8 and A9 have a life equivalent to that of the bearing steel.

TABLE 2

| Type | No. | Rolling Contact Fatigue Life $L_{10}$(×$10^4$) | | Ratio in Rolling & Sliding Fatigue Life (to S53C) | Reduction in Halfwidth After Fixed Time | Note |
| --- | --- | --- | --- | --- | --- | --- |
| | | Measured Value | Expected Value | | | |
| Present Invention's Examples | A1 | 6590 | 6321 | 1.9 | 0.4 | |
| | A2 | 6120 | 6043 | 1.5 | 0.5 | |
| | A3 | 5361 | 5224 | 1.7 | 0.4 | |
| | A4 | 5588 | 5338 | 1.4 | 0.4 | |
| | A5 | 7789 | 7601 | 1.8 | 0.3 | |
| | A6 | 6850 | 6668 | 1.2 | 0.5 | |
| | A7 | 5450 | 5538 | 1.6 | 0.5 | |
| | A8 | 7210 | 7510 | 1.5 | 0.3 | |
| | A9 | 7410 | 6940 | 1.4 | 0.4 | |
| Comparative Examples | B1 | 2630 | 2443 | 1.0 | 1.1 | S53C |
| | B2 | 5990 | 5641 | 0.8 | 0.6 | |
| | B3 | 5530 | 5840 | 0.8 | 0.6 | |
| | B4 | 2005 | 2271 | 0.7 | 0.8 | |

TABLE 2-continued

| Type | No. | Rolling Contact Fatigue Life $L_{10}(\times 10^4)$ | | Ratio in Rolling & Sliding Fatigue Life (to S53C) | Reduction in Halfwidth After Fixed Time | Note |
|---|---|---|---|---|---|---|
| | | Measured Value | Expected Value | | | |
| | B5 | 3300 | 3079 | 0.9 | 1.2 | |
| | B6 | 1920 | 1887 | 0.3 | 0.9 | |
| | B7 | 900 | 844 | 0.5 | 1.3 | |
| | B8 | 2100 | 2402 | 0.9 | 1.1 | |
| | B9 | 4610 | 4886 | 0.9 | 0.9 | |
| | B10 | 7300 | 6698 | 1.4 | 0.5 | SUJ2 |

*1) Reduction relative to X-ray halfwidth of unused specimen

By contrast, among the comparative examples, B2 and B3 provide at least $5,000 \times 10^4$ and the other comparative examples that have a relatively small alloy element content provide short life. An expected $L_{10}$ value, as indicated in table 1, is a value obtained as follows: a measured $L_{10}$ value is subjected to multiple regression analysis with an amount of chemical component C, Si, Mn as a dependent variable and as a result an expression for estimation:

$$L = 11271 (C) + 5796 (Si) + 2665 (Mn) - 6955 \quad (1)$$

is obtained, and from "L" in the expression the expected $L_{10}$ value is obtained.

Between L and $L_{10}$ there is a relationship of $L_{10} = L \times 10^4$. Therefore between $L_{10}$ and a component element's content ratio (wt %) the following expression:

$$L_{10}(\times 10^{-4}) = 11271 (C) + 5796 (Si) + 2665 (Mn) - 6955 \quad (2)$$

is established.

Figure 3:
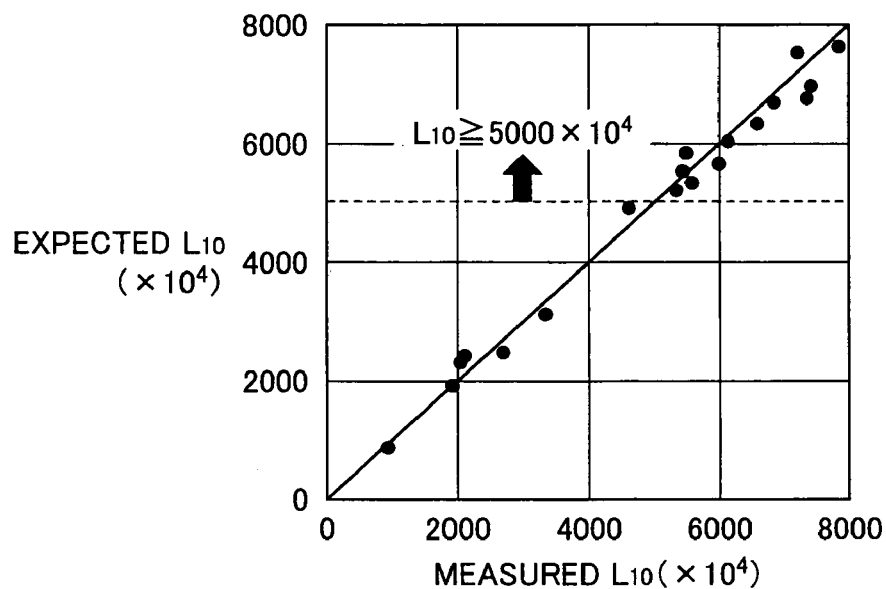
FIG. 3 represents a relationship between measured and expected values of rolling fatigue life $L_{10}$ associated with rolling in a first example.

FIG. 3 represents a relationship between each steel's measured $L_{10}$ value and the expression for estimation. The figure indicates that they have an excellent correlation. In other words, the amounts of alloy elements C, Si and Mn, can be used to estimate $L_{10}$ with high precision. Not only the range of the composition C, Si and Mn of the present invention's examples A1-A9 but a configuration that allows expression (2) to provide an estimated $L_{10}$ value of at least $5,000 \times 10^4$ would also ensure long life.

As they roll and slide the present invention's examples A1-A9 all provide life longer than S53C (comparative example B1). By contrast, the comparative examples are all inferior to S53C. When alloy composition is considered, long rolling and sliding life also requires C, Si and Mn in balance. Table 2 at the right hand indicates x-ray diffraction half width obtained after a rolling and sliding test is conducted for a fixed period of time (or after rotation $9 \times 10^5$ times under the same conditions as the rolling and sliding test) to indicate a scale of softening resistance. It is observed that the present invention's examples generally provide small reduction in half width and are less prone to fatigue as they are affected by slippery.

Thus optimizing the amount of C, Si, Mn provides increased rolling life and also allows rolling and sliding life to be increased in stable manner.

EXAMPLE 2

As shown in Table 3, the present invention's examples employ as their respective source materials steels A1-A13 providing a stress intensity factor range associated with tension associated-fatigue crack extension that has a lower limit $\Delta K\text{th}$ of at least 6.2 $\text{MPa}\sqrt{m}$. Furthermore for comparative examples steels B 1-B8 having $\Delta K\text{th}$ smaller than 6.2 $\text{MPa}\sqrt{m}$ are used as source material. Note that as has been indicated as a note, comparative example B1 is conventional material S53C and comparative example B8 is bearing steel SUJ2. Furthermore, A1-A9 each have $\Delta K\text{th}$ of at least 6.2 $\text{MPa}\sqrt{m}$ and contain C, Si, Mn falling within a composition range allowing $L_{10}$ of at least $5,000 \times 10^4$ in expression (2).

TABLE 3

| Type | No. | Alloy Composition (wt %) | | | | Note |
|---|---|---|---|---|---|---|
| | | C | Si | Mn | Cr | |
| Present Invention's Examples | A1 | 0.56 | 0.82 | 0.83 | * | |
| | A2 | 0.60 | 0.80 | 0.60 | * | |
| | A3 | 0.53 | 0.62 | 0.98 | * | |
| | A4 | 0.63 | 0.62 | 0.60 | * | |
| | A5 | 0.52 | 1.16 | 0.74 | * | |
| | A6 | 0.64 | 0.83 | 0.60 | * | |
| | A7 | 0.55 | 0.81 | 0.60 | * | |
| | A8 | 0.58 | 1.00 | 0.80 | * | |
| | A9 | 0.61 | 0.88 | 0.72 | * | |
| | A10 | 0.53 | 1.00 | 0.31 | * | |
| | A11 | 0.55 | 1.00 | 0.30 | * | |
| | A12 | 0.45 | 0.83 | 1.10 | * | |
| | A13 | 0.45 | 0.65 | 1.40 | * | |
| Comparative Examples | B1 | 0.53 | 0.20 | 0.85 | * | S53C |
| | B2 | 0.63 | 0.10 | 0.58 | * | |
| | B3 | 0.55 | 0.11 | 0.60 | * | |
| | B4 | 0.53 | 0.38 | 0.25 | * | |
| | B5 | 0.53 | 0.20 | 0.25 | * | |
| | B6 | 0.55 | 0.20 | 0.75 | * | |
| | B7 | 0.45 | 0.80 | 0.80 | * | |
| | B8 | 1.00 | 0.25 | 0.35 | 1.5 | SUJ2 |

* 0.2~0.3 wt % thereof contained (1) Fatigue Crack Extension Test

A three-point bending test is conducted to evaluate lower limit $\Delta K\text{th}$ of a stress intensity factor range associated with tension associated-fatigue crack extension. Each specimen has its external as well as internal portions uniformly hardened to eliminate effect of residual stress on fatigue crack extension. The test is conducted under the following conditions:

Dimension of specimen: 80 mm×20 mm×2 mm (having a center provided with a slit and having a previous fatigue crack introduced therein)

Figure 4:
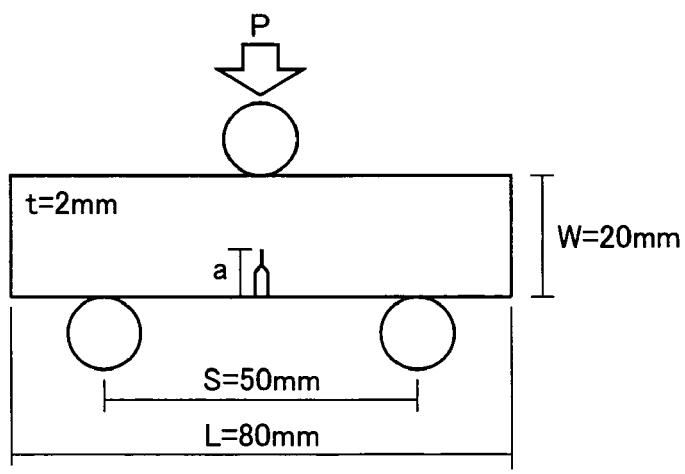
FIG. 4 shows a specimen used in a measurement performed in a fatigue crack extension test in a second example.
Figure 5:
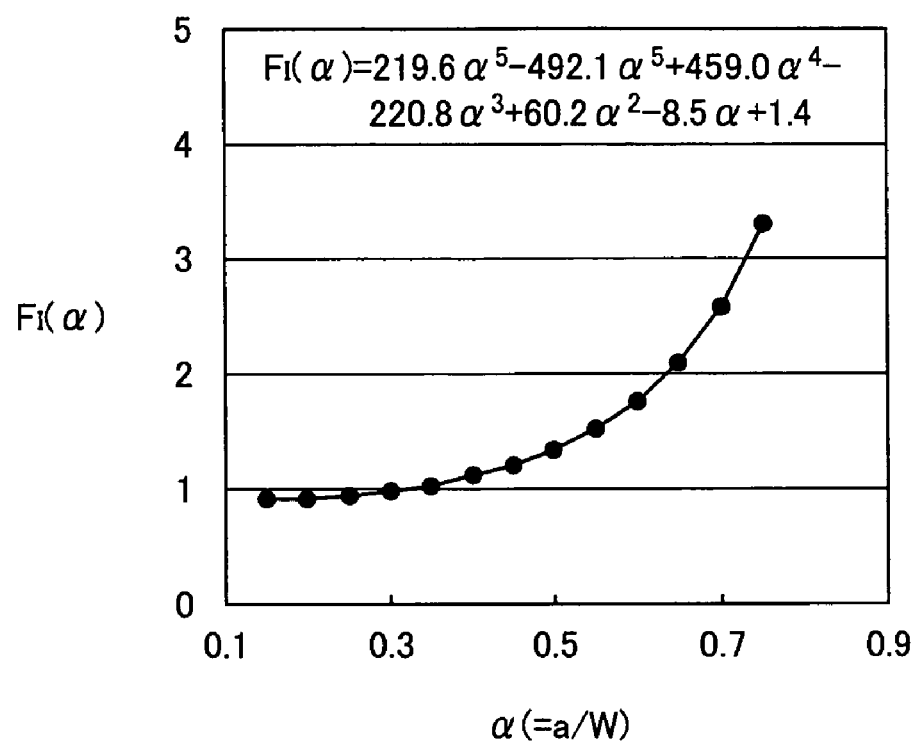
FIG. 5 represents a relationship between a correction factor $F_j(a/W)$ and $\alpha(=a/W)$ in an expression (4) calculated in the fatigue crack extension test to obtain a stress intensity factor.

FIG. 4 shows how a specimen having the above described geometry (of 80 mm×20 mm×2 mm) and three-point bending are employed to repeatedly apply a load to conduct the test. The specimen has a one side wire cut to have a slit and having an end previously provided with a fatigue crack. As shown in FIG. 4, when a load P is exerted on the center of the specimen in the three-point bending arrangement with a distance S between supporting points, a nominal bending stress $\sigma_0$ is exerted as represented in an expression (3). When a crack has a length $\alpha(m)$, stress intensity factor $K_I$ can be obtained by substituting $\sigma_0$ in an expression (4), wherein $F_f(a/W)$ is a correction factor. FIG. 5 represents a relationship between a/W and $F_f(a/W)$ obtained by finite element method (FEM).

$$\sigma_0 = 3SP/(2tW^2) \qquad (3)$$

$$K_I = F_f(a/W) \cdot \sigma_0 (\pi a)^{1/2} \qquad (4)$$

Note that lower limit ΔKth that has the value of the most restrained, and plain strain condition (i.e., Mode I type) is represented by $\Delta K_I$th. In other words, $\Delta K_I$th represents a lower limit of a stress intensity factor range of plain strain condition. In other words, the present stress intensity factor range's lower limit ΔKth is a lower limit of a stress intensity factor range for plain strain condition. In the above description it is simply indicated without a symbol indicating that it is of mode I (or plain strain condition). In the following description, the indication "I type" may occasionally be omitted and a lower limit of a stress intensity factor range for plain strain condition may occasionally be indicated by ΔKth. The above described specimen receives a load exerted by a method of applying the load, as described below:

method of applying a load: load control
load frequency: 8 Hz
stress ratio: 0.5

(2) Fatigue Test

To evaluate fatigue strength, an induction hardened ring specimen is used to conduct a fatigue test. The specimen is induction hardened to allow a hardened layer to have a depth of approximately 2 mm. Four such specimens are used and evaluated by average life. The test is conducted under the following conditions:

dimension of specimen: outer diameter of 60 mm×inner diameter of 45 mm×width of 15 mm
load: 9.5 kN
rate of rotation: 8,000 rpm (3) Rolling Contact Fatigue Test A rolling contact fatigue test is conducted under the same conditions as example 1. More specifically, an induction hardened cylindrical specimen is used to conduct the test. The specimen is induction hardened to allow a hardened layer to have a depth of approximately 2 mm. 15 such specimens are used and their rolling lives $L_{10}$ (10% life) are evaluated.

(4) Rolling and Sliding Fatigue Test

A rolling and sliding fatigue test is conducted under the same conditions as example 1. More specifically, a 2-cylinder test is conducted to conduct the test and a specimen is induction hardened to allow a hardened layer to have a depth of approximately 2 mm. Two such specimens are used and evaluated by average life.

(5) Rolling Test With Insufficient Lubrication

When lubricant oil is insufficiently supplied, oil film can partially break and a surface can generate heat and thus crack. To simulate this, the rolling and sliding fatigue test described in item (4) is conducted, although lubricant oil is applied when a specimen starts to roll, and thereafter it is rolled without the lubricant oil further supplied. Two such specimens are employed and evaluated by average life.

(6) Test Result

Table 4 indicates the results of the fatigue crack extension test, the fatigue test, the rolling contact fatigue test, the rolling and sliding fatigue test, and the rolling test with insufficient lubrication.

TABLE 4

| Type | No. | $\Delta K_{th}$ (MPa$\sqrt{m}$) | Ratio of Fatigue Life (to S53C) | Rolling Contact Fatigue Life $L_{10}(\times 10^4)$ | | Ratio in Rolling & Sliding Fatigue Life (to S53C) | Reduction in Halfwidth After Fixed Time | Note |
|---|---|---|---|---|---|---|---|---|
| | | | | Measured Value | Expected Value | | | |
| Present Invention's Examples | A1 | 6.5 | 1.7 | 6590 | 6321 | 1.9 | 1.7 | |
| | A2 | 6.3 | 1.9 | 6120 | 6043 | 1.5 | 1.6 | |
| | A3 | 6.6 | 1.6 | 5361 | 5224 | 1.7 | 1.3 | |
| | A4 | 6.2 | 2.0 | 5588 | 5338 | 1.4 | 1.3 | |
| | A5 | 6.4 | 1.6 | 7789 | 7601 | 1.8 | 1.5 | |
| | A6 | 6.3 | 2.1 | 6850 | 6668 | 1.2 | 1.4 | |
| | A7 | 6.2 | 1.6 | 5450 | 5538 | 1.6 | 1.4 | |
| | A8 | 6.7 | 2.2 | 7210 | 7510 | 1.5 | 1.8 | |
| | A9 | 6.5 | 2.1 | 7410 | 6940 | 1.4 | 1.6 | |
| | A10 | 6.2 | 1.7 | 5990 | 5641 | 0.8 | 1.3 | |
| | A11 | 6.3 | 1.8 | 5530 | 5840 | 0.8 | 1.4 | |
| | A12 | 6.4 | 1.5 | 5610 | 5859 | 1.0 | 1.3 | |
| | A13 | 6.3 | 1.5 | 5720 | 5615 | 1.0 | 1.3 | |
| Comparative Examples | B1 | 6.0 | 1.0 | 2630 | 2443 | 1.0 | 1.0 | S53C |
| | B2 | 5.8 | 0.7 | 2005 | 2271 | 0.7 | 0.7 | |
| | B3 | 5.8 | 0.6 | 3300 | 3079 | 0.9 | 0.5 | |
| | B4 | 5.6 | 0.4 | 1920 | 1887 | 0.3 | 1.0 | |
| | B5 | 5.4 | 0.2 | 900 | 844 | 0.5 | 0.9 | |
| | B6 | 5.7 | 0.5 | 2100 | 2402 | 0.9 | 1.1 | |
| | B7 | 5.8 | 0.9 | 4610 | 4886 | 0.9 | 1.2 | |
| | B8 | 5.0 | not tested | 7300 | 6698 | 1.4 | not tested | SUJ2 |

Figure 6:
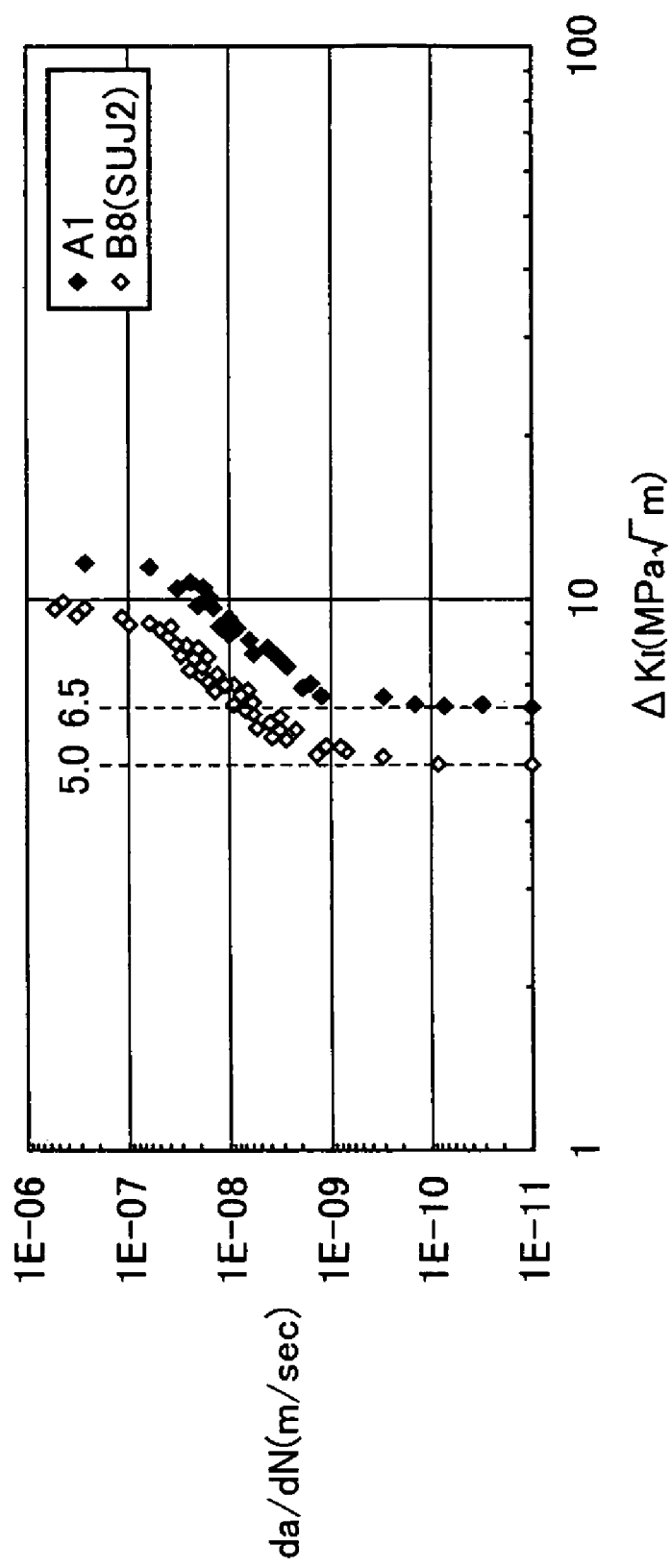
FIG. 6 illustrates how stress intensity factor range's lower limit is obtained in a relationship between crack extension rate da/dN and stress intensity factor range $\Delta K_I$ in the fatigue crack extension test.

FIG. 6 illustrates how $\Delta K_I$th is obtained in the fatigue crack extension test. FIG. 6 represents a relationship between a crack extension rate da/dN and a stress intensity factor range $\Delta K_I$ of each of the present invention's example A1 and comparative example B8 (SUJ2). A stress intensity factor range has lower limit $\Delta K_I$th, which is a stress intensity factor indicated when applying a load no longer extends a crack. From the FIG. 6 plot, the present invention's example A1 provides $\Delta K_I$th of 6.5 Mpa√m and comparative example B8 provides $\Delta K_I$th of 5.0 Mpa√m.

The fatigue crack extension test reveals that the present invention's examples A1-A13 all provide $\Delta K$th of at least 6.2 Mpa√m, whereas comparative examples B1-B8 provide $\Delta K$th of at most 6.0 Mpa√m, which is provided by B1 (S53C), and the other comparative examples provide smaller $\Delta K$th.

The fatigue test reveals that the present invention's examples A1-A13 all provide a fatigue life at least 1.5 times comparative example B1 (S53C). Comparative examples B2-B7 are all inferior to comparative example B1 (S53C).

As measured, conventional medium carbon steel S53C (comparative example B1) has a rolling contact fatigue life $L_{10}$ of $2,630 \times 10^4$ and bearing steel SUJ2 (comparative example B10) has a rolling contact fatigue life $L_{10}$ of $7,300 \times 10^4$, and S53C is less than half the bearing steel. Although the present invention's examples, formed only of inexpensive alloy component, could not be comparable to bearing steel SUJ2, it is desirable that they have an $L_{10}$ at least approximately twice S53C, i.e., at least $5,000 \times 10^4$. In this regard, the present invention's examples A1-A9 all provide at least $5,000 \times 10^4$ and in particular, A5, A8 and A9 have a life equivalent to that of the bearing steel. By contrast, comparative examples B2-B7 all provide short life of less than $5,000 \times 10^4$. An expected $L_{10}$ value, as indicated in table 3, is a value obtained as follows: a measured $L_{10}$ value is subjected to multiple regression analysis with an amount of chemical component C, Si, Mn as a dependent variable and as a result expression (2) is obtained and therefrom the expected $L_{10}$ value is obtained.

Figure 7:
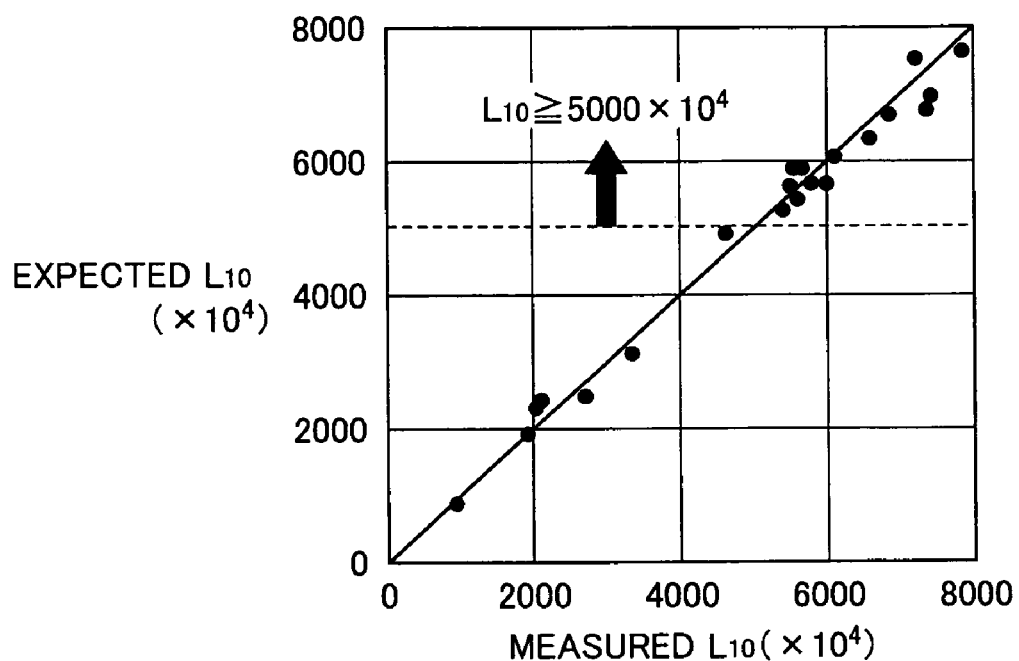
FIG. 7 shows a relationship between measured and expected values of rolling fatigue life $L_{10}$ associated with rolling in the second example.

FIG. 7 represents a relationship between measured and expected $L_{10}$ values. The figure indicates that they have an excellent correlation. In other words, the amounts of alloy elements C, Si and Mn, can be used to estimate $L_{10}$ with high precision. Not only the numerical range of C, Si and Mn of the present invention's examples A1-A13 but a configuration that allows expression (2) to provide an estimated $L_{10}$ value of at least $5,000 \times 10^4$ would also ensure long life.

As they roll and slide the present invention's examples A1-A9 all provide life longer than S53C (comparative example B1). In contrast, A10-A13 have a rolling and sliding life equivalent to or slightly shorter than S53C and the comparative examples except B8 (SUJ2) are all inferior to S53C. When alloy composition is considered, any example, either the present invention's or the comparative examples, that contains a large amount of Mn has a tendency to provide long rolling and sliding life.

The rolling test with small lubrication reveals that the present invention's examples A1-A13 all superior to S53C (comparative example B1). Among the comparative examples, B6 and B7, containing two of C, Si and Mn in large amount, provide a relatively long life, however they do not have such a long life as provided under the above described conditions for the rolling and sliding fatigue test.

Thus to allow medium carbon steel based material to provide longer fatigue life, longer rolling contact fatigue life, longer rolling and sliding fatigue life, and longer life despite insufficient lubrication, a $\Delta K$th of at least 6.2 Mpa√m is first of all necessary. Furthermore, to ensure that $\Delta K$th, C, Si and Mn can be adjusted in amount to improve other performance in reliability.

The present induction hardened rolling component can have a rolling part or induction hardened portion having a surface resistant to cracking and its propagation and can also have a rolling life comparable to that of bearing steel as the component rolls as well as it slides and/or repeated tensile stress strength other than rolling is superimposed, and when the above rolling component is used in a power transmission component, the power transmission component can have both increased strength and increase life.

Hereinafter the above described examples as well as the present invention's embodiment and its function and effect, and alloy element's function and effect in particular, will comprehensively be described.

The present rolling component in one embodiment can be formed of a steel material having an alloy composition range, as described hereinafter, allowing the steel's induction hardened portion to have the above described $\Delta K$th that has a value of at least 6.2 Mpa√m to ensure further increased life. More specifically, a rolling component may be configured within a composition containing 0.5-0.7 wt % of C, 0.6-1.2 wt % of Si and 0.6-1.5 wt % of Mn, and the remainder formed of Fe and an unavoidable impurity.

The carbon content of 0.5-0.7 wt % is adopted because it allows induction hardening to ensure at least a level of hardness and it can coexist with a fixed amount of Si, Mn and the like to ensure a rolling contact fatigue life under large load. To achieve this, a carbon content of 0.5 wt % or more is required. To achieve further increased hardness and further increased rolling contact fatigue life, it is desirable that 0.55 wt % or more of carbon be contained.

Carbon forms carbide, and to obtain constant hardness, larger amounts of carbon are better introduced. Excessively large amounts of carbon, however, result in source material having excessively increased hardness and poor workability. Furthermore, it requires soaking to prevent component segregation, carbide spheroidization, and/or similar special heat treatment, which invites increased cost, and accordingly, 0.7 wt % is set as an upper limit. Furthermore, to ensure the Mn's effect as described above and in addition thereto reduce a detriment associated with component segregation, a carbon content set to at most 0.65 wt % is desirable.

Si is an element reinforcing steel's base metal to provide increased rolling life. Containing 0.6 wt % or more of Si allows the steel to be resistant to softening despite exposure to high temperature to retard structural variation, cracking and/or the like attributed to large load repeatedly exerted. Accordingly, Si has a lower limit set to be 0.6 wt %. To obtain further increased resistance to softening despite exposure to at high temperature, 0.7 wt % or more is desirable.

On the other hand, increasing the amount of Si does not contribute to increase source material in hardness as Mn does, as described later, and Si exceeding 1.2 wt % impairs cold workability and hot workability. Accordingly, 1.2 wt % is set as an upper limit. Furthermore, to prevent a surface from having a property impaired by internal oxidation of Si at a surface during hot working, Si is desirably set to be 1.1 wt % or less. Furthermore to alleviate surface decarburization, 1.0 wt % or less is desirable.

Containing 0.6 wt % or more of Mn improves steel material's quenchability. Furthermore, the steel is toughened by solid solution of Mn and retained austenite beneficial for rolling contact fatigue life is increased. Furthermore, Mn is also effective in improving lower limit $\Delta K$th of a stress intensity factor range associated with tension associated-fatigue crack extension. Accordingly, 0.6 wt % or more of Mn is contained. To further increase retained austenite to obtain further increased rolling life, 0.7 wt % or more of Mn is desirably contained.

On the other hand, Mn, as well as Si, acts to reinforce source material and in addition thereto also enters carbide and acts to increase the carbide's hardness. Containing 1.5 wt % or more of Mn excessively increases source material in hardness and impairs it in workability and grindability. Accordingly, Mn is contained in an amount having an upper limit of 1.5%. To provide reduced level of component segregation and for example to reduce the cost for soaking, Mn set to 1.25 wt % or less is desirable. Furthermore, if a cast ingot in production has a large size, more significant component segregation is caused. Accordingly, Mn set to 1.0 wt % or less is further desirable.

If an electric furnace is employed to provide ingot steel, scraps are employed as main source material, and impurities contained in the scraps are introduced into the steel. For example, 0.3 wt % or less of Cr, 0.3 wt % or less of copper, and other impurities are introduced from the scraps into the steel. Such impurities introduced from source material for producing steel are considered as unavoidably contained impurities. In other words, if a rolling component contains such impurity the rolling component corresponds to the present rolling component.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

In accordance with the present invention a rolling component can be formed of steel material including medium carbon steel having a composition adjusted to provide a rolling contact fatigue life increased to be comparable to that of bearing steel containing an expensive alloy element and also provide improved characteristic against surface-cracking. As a result the present rolling component and power transmission component employing the rolling component are expected to be used in automobiles and the like pursuing energy conservation and miniaturization at power transmission systems in which there is slippery and repeated tensile stress other than rolling is superimposed.

The invention claimed is:

1. A rolling component formed of a steel having an induction hardened portion having a stress intensity factor range associated with tension associated-fatigue crack extension that has a lower limit $\Delta K_{th}$ of 6.2 Mpa$\sqrt{m}$.

2. The rolling component of claim 1, wherein said steel has a composition containing 0.5-0.7 wt % of C, 0.6-1.2 wt % of Si, 0.6-1.5 wt % of Mn, and a remainder formed of Fe and unavoidable impurity.

3. The rolling component of claim 1, wherein said steel is steel material having C, Si and Mn adjusted in content, as represented in wt %, to satisfy $L \geq 5,000$ in the following expression:

$$L=11271(C)+5796(Si)+2665(Mn)-6955 \tag{1}$$

4. A power transmission component comprising the rolling component of claim 1.

5. The power transmission component of claim 4, corresponding to a hub joint including a wheel bearing and a constant velocity joint united together.

6. The power transmission component of claim 4, wherein said rolling component slides as it rolls.

* * * * *